(12) United States Patent
Huang

(10) Patent No.: US 8,885,123 B2
(45) Date of Patent: Nov. 11, 2014

(54) THREE-DIMENSIONAL DISPLAY APPARATUS AND METHOD FOR MANUFACTURING THE SAME

(75) Inventor: Hong-Ji Huang, Shenzhen (CN)

(73) Assignee: Shenzhen China Star Optoelectronics Technology Co. Ltd., Shenzhen (CN)

(*) Notice: Subject to any disclaimer, the term of this patent is extended or adjusted under 35 U.S.C. 154(b) by 0 days.

(21) Appl. No.: 13/264,854

(22) PCT Filed: Jul. 26, 2011

(86) PCT No.: PCT/CN2011/077645
§ 371 (c)(1),
(2), (4) Date: Oct. 17, 2011

(87) PCT Pub. No.: WO2013/010336
PCT Pub. Date: Jan. 24, 2013

(65) Prior Publication Data
US 2014/0118643 A1 May 1, 2014

(30) Foreign Application Priority Data
Jul. 18, 2011 (CN) .......................... 2011 1 0200833

(51) Int. Cl.
G02F 1/1335 (2006.01)
C09K 19/02 (2006.01)
G02B 27/22 (2006.01)
G02F 1/141 (2006.01)
G02B 27/26 (2006.01)
H04N 13/04 (2006.01)

(52) U.S. Cl.
CPC .............. *G02B 27/225* (2013.01); *G02F 1/141* (2013.01); *G02B 27/26* (2013.01); *H04N 13/0434* (2013.01); *G02F 1/1335* (2013.01)

USPC .............. 349/100; 349/96; 349/98; 349/117; 349/172

(58) Field of Classification Search
CPC .............. G02B 27/2228; G02B 27/26; H04N 13/0434; G02F 1/1358
USPC ................................ 349/96, 98, 100, 117, 172
See application file for complete search history.

(56) References Cited

U.S. PATENT DOCUMENTS

| 4,870,486 | A * | 9/1989 | Nakagawa et al. ............. 349/15 |
| 2001/0043266 | A1 | 11/2001 | Robinson et al. |
| 2006/0291053 | A1* | 12/2006 | Robinson et al. ............. 359/465 |
| 2008/0211736 | A1* | 9/2008 | Taira et al. .................... 345/6 |
| 2011/0063424 | A1* | 3/2011 | Matsuhiro et al. ............. 348/58 |

FOREIGN PATENT DOCUMENTS

| CN | 101625467 A | 1/2010 |
| CN | 101881890 A | 11/2010 |
| CN | 202166803 U | 3/2012 |
| JP | 01-128039 A | 5/1989 |
| JP | 01-316091 A | 12/1989 |

* cited by examiner

*Primary Examiner* — Nathanael R Briggs
(74) *Attorney, Agent, or Firm* — Mark M Friedman

(57) ABSTRACT

The present invention provides a 3D display apparatus which comprises a display and a liquid crystal cell module. The liquid crystal cell module retards a phase of the light emitted from the display and corresponding to a display frame for forming a left-handed circularly polarized light and a right-handed circularly polarized light. The present invention further provides a method for manufacturing the 3D display apparatus. The present invention can display 3D images without losing image information. The response time of a ferroelectric liquid crystal and an anti-ferroelectric liquid crystal of the present invention is faster, and thus the effect on the luminance of the display is less.

4 Claims, 4 Drawing Sheets

THREE-DIMENSIONAL DISPLAY APPARATUS AND METHOD FOR MANUFACTURING THE SAME

FIELD OF THE INVENTION

The present invention relates to a three-dimensional (3D) display apparatus, and more particularly to a method for manufacturing the 3D display apparatus.

BACKGROUND OF THE INVENTION

Conventional 3D display techniques include techniques such as active shutter glasses and fixed polarized glasses, which both are required to operate with glasses, and other techniques such as cylindrical lens and fixed grating which are not required to operate with glasses.

When using the fixed polarized glasses, a ¼ wave film is disposed at an outer side of a light-output surface of a display for transforming a linearly polarized light into a circularly polarized light. Subsequently, the light is passed through a phase retarder with fixed patterns having a phase difference of ½ wave (180 degrees), such that there is a phase retardation between the light signals which reach an observer's right eye and left eye for forming a left-handed circularly polarized light and a right-handed circularly polarized light, respectively. When the observer wears the fixed polarized glasses, the left-handed circularly polarized light and the right-handed circularly polarized light reach the left eye and the right eye, respectively, thereby forming a 3D image. The greatest disadvantage of the fixed polarized glasses is that the left eye information is required to be simultaneously shown in a frame as with the right eye information, and thus the image information being displayed on the display is reduced. At the same time, the viewing angle of the technique of the polarized glasses is limited at one direction. In addition, in the manufacturing process, the patterned retarder is required to be precisely positioned with the display, thus complicates the manufacturing process thereof. Therefore, the complicated manufacturing process deteriorates the process yield and increases manufacturing cost thereof.

SUMMARY OF THE INVENTION

An object of the present invention is to provide a 3D display apparatus and a method for manufacturing the 3D display apparatus, so as to solve a problem that an image information is reduced by a half of the conventional 3D display.

The object of the present invention is achieved by technical solutions as follows.

A 3D display apparatus comprises a display and a liquid crystal cell module, and the display comprises a polarizer, and the liquid crystal cell module comprises a ferroelectric liquid crystal cell or an anti-ferroelectric liquid crystal cell for retarding a phase of the light emitted from the display and corresponding to a display frame, and forming a left-handed circularly polarized light and a right-handed circularly polarized light of the display frame.

In one embodiment of the present invention, the liquid crystal cell module comprises a ferroelectric liquid crystal cell and a ¼ wave phase retarder, and the ferroelectric liquid crystal cell has a ½ wave phase retardation, and the ferroelectric liquid crystal cell and the ¼ wave phase retarder are bonded to a light-output surface of the display, and an absorption axis of the polarizer of the display is parallel to the orientation of the ferroelectric liquid crystal cell, and a 45 degree angle is therebetween the ¼ wave phase retarder and the absorption axis of the polarizer of the display, and an electric field is applied across the ferroelectric liquid crystal cell to alter a polarization direction thereof.

In one embodiment of the present invention, the liquid crystal cell module comprises a ferroelectric liquid crystal cell and a ¼ wave phase retarder, and the ferroelectric liquid crystal cell has a ½ wave phase retardation, and the ferroelectric liquid crystal cell and the ¼ wave phase retarder are bonded to a light-output surface of the display, and a 22.5 degree angle is therebetween an absorption axis of the polarizer of the display and the orientation of the ferroelectric liquid crystal cell, and the ¼ wave phase retarder is parallel to the absorption axis of the polarizer of the display, and an electric field is applied across the ferroelectric liquid crystal cell to alter a polarization direction thereof.

In one embodiment of the present invention, the liquid crystal cell module comprises an anti-ferroelectric liquid crystal cell, and the anti-ferroelectric liquid crystal cell is bonded to a light-output surface of the display, and an absorption axis of the polarizer of the display is parallel to the orientation of the anti-ferroelectric liquid crystal cell, and an electric field is applied across the ferroelectric liquid crystal cell to alter a polarization direction thereof.

In one embodiment of the present invention, the display is a liquid crystal display.

A 3D display apparatus comprises a display and a liquid crystal cell module, and the display comprises a polarizer, and the liquid crystal cell module retards a phase of the light emitted from the display and corresponding to a display frame for forming a left-handed circularly polarized light and a right-handed circularly polarized light of the display frame.

In one embodiment of the present invention, the liquid crystal cell module comprises a ferroelectric liquid crystal cell and a ¼ wave phase retarder, and the ferroelectric liquid crystal cell has a ½ wave phase retardation, and the ferroelectric liquid crystal cell and the ¼ wave phase retarder are bonded to a light-output surface of the display, and an absorption axis of the polarizer of the display is parallel to the orientation of the ferroelectric liquid crystal cell, and a 45 degree angle is therebetween the ¼ wave phase retarder and the absorption axis of the polarizer of the display, and an electric field is applied across the ferroelectric liquid crystal cell to alter a polarization direction thereof.

In one embodiment of the present invention, the liquid crystal cell module comprises a ferroelectric liquid crystal cell and a ¼ wave phase retarder, and the ferroelectric liquid crystal cell has a ½ wave phase retardation, and the ferroelectric liquid crystal cell and the ¼ wave phase retarder are bonded to a light-output surface of the display, and a 22.5 degree angle is therebetween an absorption axis of the polarizer of the display and the orientation of the ferroelectric liquid crystal cell, and the ¼ wave phase retarder is parallel to the absorption axis of the polarizer of the display, and an electric field is applied across the ferroelectric liquid crystal cell to alter a polarization direction thereof.

In one embodiment of the present invention, the liquid crystal cell module comprises an anti-ferroelectric liquid crystal cell, and the anti-ferroelectric liquid crystal cell is bonded to a light-output surface of the display, and an absorption axis of the polarizer of the display is parallel to the orientation of the anti-ferroelectric liquid crystal cell, and an electric field is applied across the ferroelectric liquid crystal cell to alter a polarization direction thereof.

In one embodiment of the present invention, the display is a liquid crystal display.

The present invention further provides a method for manufacturing the 3D display apparatus, and the technical solutions thereof are provided as follows.

A method for manufacturing a 3D display apparatus comprises the following steps: providing a display, wherein the display comprises a polarizer; arranging a liquid crystal cell module at a light-output side of the display for retarding a phase of the light which is emitted from the display and corresponds to a display frame for forming a left-handed circularly polarized light and a right-handed circularly polarized light corresponding to the display frame.

In one embodiment of the present invention, the liquid crystal cell module is manufactured by using the following steps: providing a ferroelectric liquid crystal cell, wherein the ferroelectric liquid crystal cell has a ½ wave phase retardation; providing a ¼ wave phase retarder; bonding the ferroelectric liquid crystal cell and the ¼ wave phase retarder to a light-output surface of the display, wherein an absorption axis of the polarizer of the display is parallel to the orientation of ferroelectric liquid crystal cell, and a 45 degree angle is therebetween the ¼ wave phase retarder and the absorption axis of the polarizer of the display; and applying an electric field across the ferroelectric liquid crystal cell to alter a polarization direction thereof.

In one embodiment of the present invention, the liquid crystal cell module is manufactured by using the following steps: providing a ferroelectric liquid crystal cell, wherein the ferroelectric liquid crystal cell has a ½ wave phase retardation; providing a ¼ wave phase retarder; bonding the ferroelectric liquid crystal cell and the ¼ wave phase retarder to a light-output surface of the display, wherein a 22.5 degree angle is therebetween an absorption axis of the polarizer of the display and the orientation of the ferroelectric liquid crystal cell, and the ¼ wave phase retarder is parallel to the absorption axis of the polarizer of the display; and applying an electric field across the ferroelectric liquid crystal cell to alter a polarization direction thereof.

In one embodiment of the present invention, the liquid crystal cell module is manufactured by using the following steps: providing an anti-ferroelectric liquid crystal cell, wherein the anti-ferroelectric liquid crystal cell has a ¼ wave phase retardation; bonding the anti-ferroelectric liquid crystal cell to a light-output surface of the display, wherein an absorption axis of the polarizer of the display is parallel to the orientation of the anti-ferroelectric liquid crystal cell; and applying an electric field across the anti-ferroelectric liquid crystal cell to alter a polarization direction thereof.

In one embodiment of the present invention, the display is a liquid crystal display.

A conventional phase retarder having fixed intervals and a phase difference of ½ wavelength is not used in the 3D display apparatus of the present invention. However, the present invention can use an active phase retarder to retard a phase of the light which is emitted from the display and corresponding to a display frame. By altering the orientation of the liquid crystal cell, a polarization direction thereof is altered for forming a left-handed circularly polarized light and a right-handed circularly polarized light of the display frame. Therefore, a 3D displaying can be achieved without losing the image information for preventing the problem that the image resolution is reduced by half.

The ferroelectric liquid crystal cell and the anti-ferroelectric liquid crystal cell being used in the present invention have a characteristic of a wide viewing angle, and thus the viewing angle of the stereoscopic liquid crystal display apparatus of the present invention would not be affected. Besides, the response time of the ferroelectric liquid crystal cell and the anti-ferroelectric liquid crystal cell is less than the response time of the nematic liquid crystal (e.g. lower than 1 millisecond). Thus, the effect on the luminance of the 3D display apparatus is less than the display with the active shutter 3D technology.

The structure and the technical means adopted by the present invention to achieve the above and other objects can be best understood by referring to the following detailed description of the preferred embodiments and the accompanying drawings.

DETAILED DESCRIPTION OF THE PREFERRED EMBODIMENTS

The following embodiments are referring to the accompanying drawings for exemplifying specific implementable embodiments of the present invention.

Figure 1:
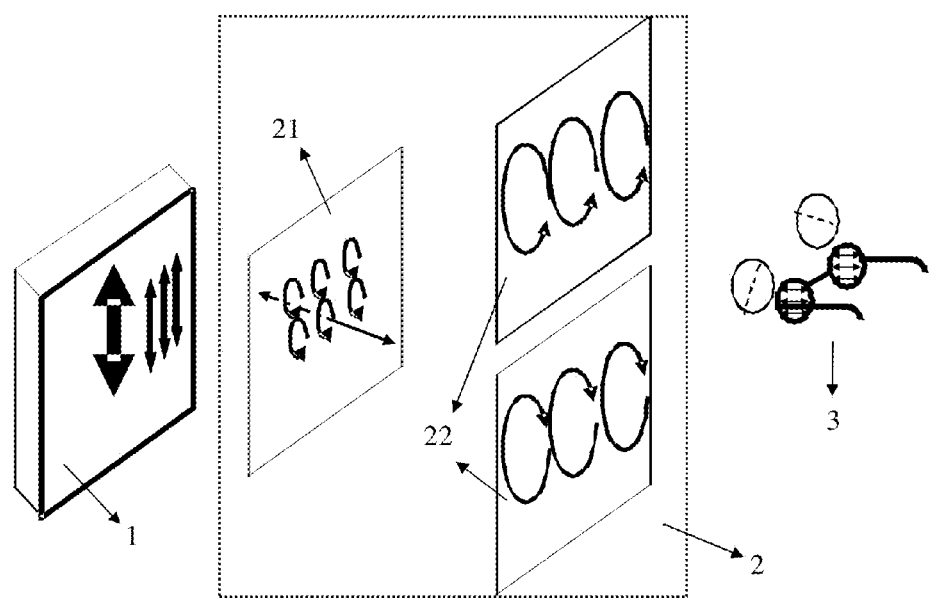
FIG. 1 is a schematic diagram showing a light path of the present invention.

In a first embodiment, referring to FIG. 1, a schematic diagram showing a light path of a 3D display apparatus of the present invention is illustrated. The 3D display apparatus comprises a display 1 and a liquid crystal cell module 2. The liquid crystal cell module 2 is disposed between the display 1 and a viewer. The display 1 comprises a polarizer. The liquid crystal cell module 2 comprises a liquid crystal cell 21 and a ¼ wave phase retarder 22. The double-headed arrows in the display 1 are used herein to indicate a transmission direction of the polarizer of the display. The light which is emitted from the display and corresponds to a display frame is retarded with the retardation of 0 wave by the liquid crystal cell 21 at a time point T1, and is also retarded with the retardation of ½ wave by the liquid crystal cell 21 at another time T2, thereby forming a left-handed circularly polarized light and a right-handed circularly polarized light of the display frame. A left glass of polarizer glasses 3 which is worn by a user includes a ¼ wave plate, and a right glass thereof includes a −¼ wave plate. The left-handed circularly polarized light and the right-handed circularly polarized light are allowed to pass through the left glass and the right glass, respectively, forming the 3D images.

Figure 2:
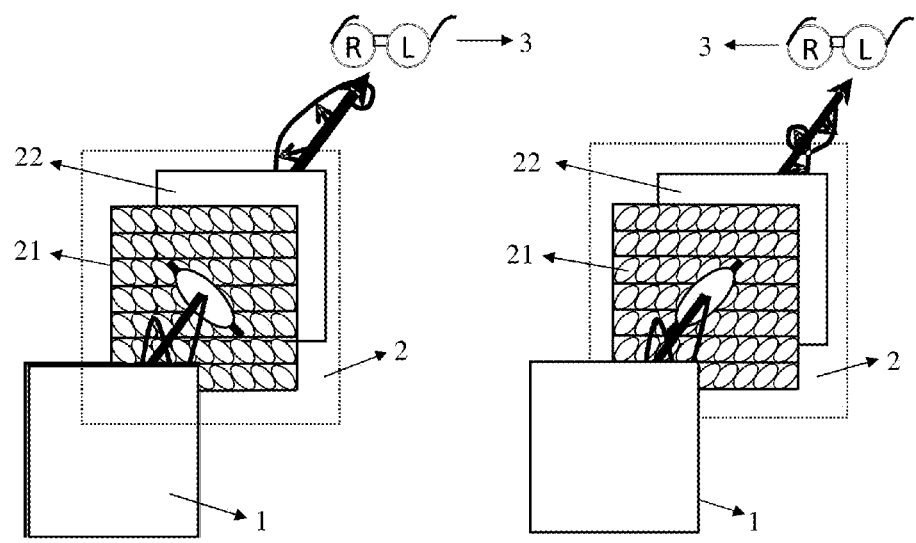
FIG. 2 is a schematic diagram showing a 3D display apparatus according to a first embodiment of the present invention.

Referring to FIG. 2, a schematic diagram showing the 3D display apparatus according to the first embodiment of the present invention is illustrated. In this case, the display 1 is a liquid crystal display, and the display 1 comprises a polarizer. The liquid crystal cell module 2 comprises the ferroelectric liquid crystal cell 21 and the ¼ wave phase retarder 22. The ferroelectric liquid crystal cell 21 has a ½ wave phase retardation. The ferroelectric liquid crystal cell 21 and the ¼ wave phase retarder 22 are bonded to a light-output surface of the display 1. An absorption axis of the polarizer of the display 1 is parallel to the orientation of liquid crystal molecules of the liquid crystal cell module 2. A 45 degree angle is therebetween the ¼ wave phase retarder 22 and the absorption axis of the polarizer of the display 1. An electric field is applied across the ferroelectric liquid crystal cell 21 to alter a polarization direction thereof.

When a light is passed through the ferroelectric liquid crystal cell 21, and there is no electric field applied thereto, the polarization direction thereof is not varied. If an appropriate voltage is applied to the ferroelectric liquid crystal cell 21, the orientation of the liquid crystal molecules of the ferroelectric liquid crystal cell 21 is altered to another steady state, and the polarization direction of thereof is altered by 90 degrees with the use of the ½ wave phase retardation of the ferroelectric liquid crystal cell 21. The ¼ wave phase retarder 22 is parallel to the absorption axis of the polarizer of the display 1. The light which is emitted from the liquid crystal display 1 is passed through the ferroelectric liquid crystal cell 21 and the ¼ wave phase retarder 22 in sequence. The left-handed circularly polarized light and the right-handed circularly polarized light can be formed, respectively, due to the different polarization direction thereof. Then the left-handed circularly polarized light and the right-handed circularly polarized light are polarized by the polarizer glasses 3 corresponding to both eyes, respectively, hence forming a left eye image and a right eye image. The brain of the viewer can fuse these two images together to form an image with 3D effect.

In a second embodiment, a structure of the 3D display apparatus of the present embodiment is basically similar to the structure of the 3D display apparatus of the first embodiment. The difference between the present embodiment and the first embodiment is where a 22.5 degree angle is therebetween the absorption axis of the polarizer of the display 1 and the orientation of liquid crystal molecules of the ferroelectric liquid crystal cell 21. The phase retardation of the ferroelectric liquid crystal cell 21 is ½ wavelength. The ¼ wave phase retarder 22 is parallel to the absorption axis of the polarizer of the display 1. An electric field is applied across the ferroelectric liquid crystal cell 21 to alter a polarization direction thereof.

When there is no electric field applied, the angle between the absorption axis of the polarizer of the display 1 and the ferroelectric liquid crystal cell 21 is 22.5 degrees. When an appropriate voltage is applied to the ferroelectric liquid crystal cell 21, the angle between the absorption axis of the polarizer of the display 1 and the ferroelectric liquid crystal cell 21 is −22.5 degrees. With the use of the phase retardation of the ferroelectric liquid crystal cell 21, the polarization direction of thereof is altered by 45 degrees and −45 degrees, respectively. The ¼ wave phase retarder 22 is parallel to the absorption axis of the polarizer of the display 1. The light which is emitted from the liquid crystal display 1 is passed through the ferroelectric liquid crystal cell 21 and the ¼ wave phase retarder 22 in sequence. The left-handed circularly polarized light and the right-handed circularly polarized light can be formed, respectively, due to the different polarization direction thereof. Then the left-handed circularly polarized light and the right-handed circularly polarized light are polarized by the polarizer glasses 3 corresponding to both eyes, respectively, hence forming a left eye image and a right eye image. The brain of the viewer can fuse these two images together to form an image with 3D effect.

Figure 3:
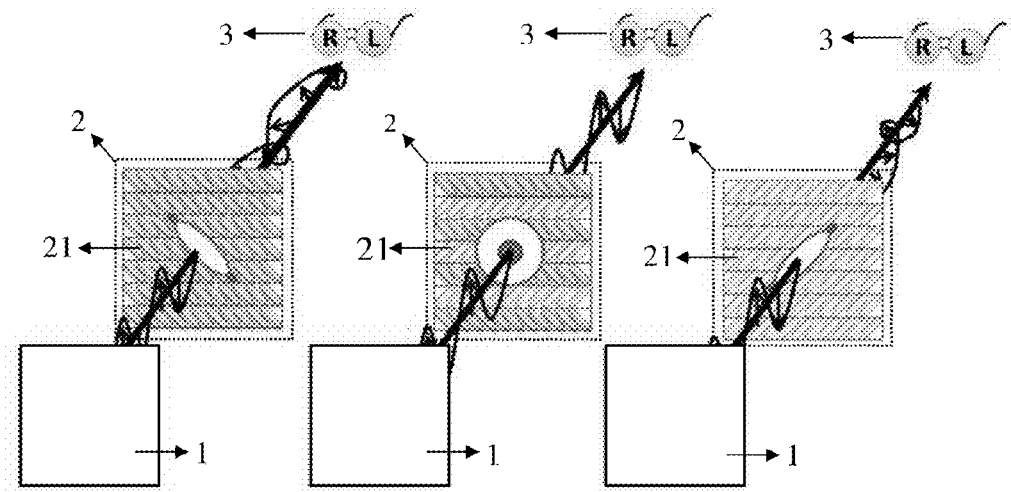
FIG. 3 is a schematic diagram showing a 3D display apparatus according to a third embodiment of the present invention.

In a third embodiment, referring to FIG. 3, a schematic diagram showing a light path of a 3D display apparatus according to the third embodiment of the present invention is illustrated. The 3D display apparatus comprises a display 1 and a liquid crystal cell module 2. The display 1 comprises the polarizer. The light which is emitted from the display and corresponds to a display frame is retarded by the liquid crystal cell module 2, thereby forming the left-handed circularly polarized light and the right-handed circularly polarized light of the display frame. The display 1 is a liquid crystal display. The liquid crystal cell module 2 comprises the anti-ferroelectric liquid crystal cell 21. The anti-ferroelectric liquid crystal cell 21 has a ¼ wave phase retardation. The anti-ferroelectric liquid crystal cell 21 is bonded to a light-output surface of the display 1. The absorption axis of the polarizer of the display 1 is parallel to the orientation of liquid crystal molecules of the liquid crystal cell module 2. An electric field is applied across the anti-ferroelectric liquid crystal cell 21 to alter a polarization direction thereof. When the light is passed through the anti-ferroelectric liquid crystal cell 21, and there is no electric field applied thereto, the phase retardation thereof is 0, and the polarization direction thereof is not varied. If an appropriate forward voltage is applied to the anti-ferroelectric liquid crystal cell 21, the phase retardation of the anti-ferroelectric liquid crystal cell 21 is ¼ wavelength. If an appropriate reverse voltage is applied to the anti-ferroelectric liquid crystal cell 21, the phase retardation of the anti-ferroelectric liquid crystal cell 21 is −¼ wavelength. That is, the phase retardation between three stead states of the anti-ferroelectric liquid crystal cell 21 is −¼ wavelength is ¼ and −¼ wavelength, respectively. After the light emitted from the display 1 passed through the anti-ferroelectric liquid crystal cell 21, the left-handed circularly polarized light and the right-handed circularly polarized light can be formed, respectively, due to the different polarization direction thereof. Then the left-handed circularly polarized light and the right-handed circularly polarized light are polarized by the polarizer glasses 3 corresponding to both eyes, respectively, hence forming a left eye image and a right eye image. The brain of the viewer can fuse these two images together to form an image with 3D effect.

In a fourth embodiment, a method for manufacturing the 3D display apparatus is provided. The method comprises the following steps: providing the display, wherein the display comprises the polarizer; and arranging the liquid crystal cell module at a light output side of the display for retarding the phase of the light which is emitted from the display and corresponds to the display frame, thereby forming the left-handed circularly polarized light and the right-handed circularly polarized light corresponding to the display frame.

In this embodiment, the liquid crystal cell module is manufactured by using the following steps: providing the ferroelectric liquid crystal cell, wherein the ferroelectric liquid crystal cell has the ½ wave phase retardation; providing the ¼ wave phase retarder; bonding the ferroelectric liquid crystal cell and the ¼ wave phase retarder to the light-output surface of the display, wherein the absorption axis of the polarizer of the display is parallel to the orientation of ferroelectric liquid crystal cell, and the ¼ wave phase retarder is parallel to the absorption axis of the polarizer of the display; and applying an electric field across the ferroelectric liquid crystal cell to alter a polarization direction thereof.

In a fifth embodiment, another method for manufacturing the 3D display apparatus is provided. The method of the present embodiment for manufacturing the 3D display apparatus is basically similar to the method of the fourth embodiment for manufacturing the 3D display apparatus. The difference between the present embodiment and the fourth embodiment is that a 22.5 degree angle is therebetween the absorption axis of the polarizer of the display and the orientation of liquid crystal molecules of the ferroelectric liquid crystal cell and the ¼ wave phase retarder is parallel to the absorption axis of the polarizer of the display.

In a sixth embodiment, the liquid crystal cell module is manufactured by using the following steps: providing the anti-ferroelectric liquid crystal cell, wherein the anti-ferroelectric liquid crystal cell has the ¼ wave phase retardation; bonding the anti-ferroelectric liquid crystal cell to the light-output surface of the display, wherein the absorption axis of the polarizer of the display is parallel to the orientation of anti-ferroelectric liquid crystal cell; and applying an electric field across the anti-ferroelectric liquid crystal cell to alter a polarization direction thereof.

The sequence for bonding the ferroelectric liquid crystal cell and ¼ wave phase retarder to the light-output surface of the display is not limited in the present invention.

Preferably, a refresh rate of the liquid crystal display is raised twice, so as to allow more image information to enter the polarizer glasses corresponding to both eyes, hence making images of the display smoother.

Preferably, the ferroelectric liquid crystal cell or the anti-ferroelectric liquid crystal cell and the ¼ wave phase retarder can be integrated to an optical composite plate by adhesion or crystal layer-separated growth. The integrated optical composite plate can be bonded to the light-output surface of the liquid crystal display for reducing process time and cost.

In the present invention, the ferroelectric liquid crystal cell or the anti-ferroelectric liquid crystal cell is used to act as a high-speed phase modulator which alters the orientation of the liquid crystal molecules of the ferroelectric liquid crystal cell or the anti-ferroelectric liquid crystal cell by applying an electric field. The phase retardation of the ferroelectric liquid crystal cell or the anti-ferroelectric liquid crystal cell is used to alter the polarization direction thereof. The light which is passed through the ¼ wave phase retarder is transformed into a left-handed circularly polarized light and a right-handed circularly polarized light, respectively, and a 3D function can be achieved incorporating with the polarizer glasses corresponding to the left and right eyes. The technique of this invention can prevent the problem that the image resolution is reduced by half.

Figure 4A:
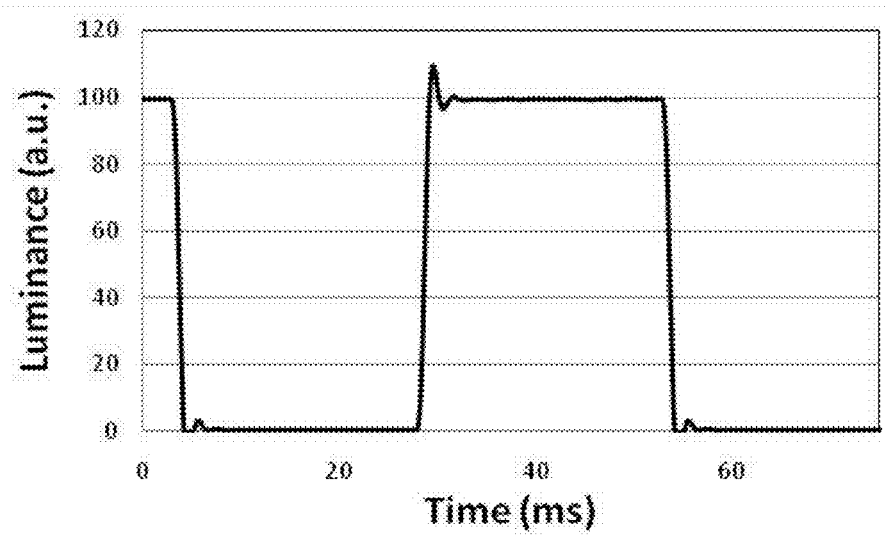
FIGS. 4A and 4B are graphs showing test results of a response time of an anti-ferroelectric liquid crystal cell used in the third embodiment of the present invention.
Figure 4B:
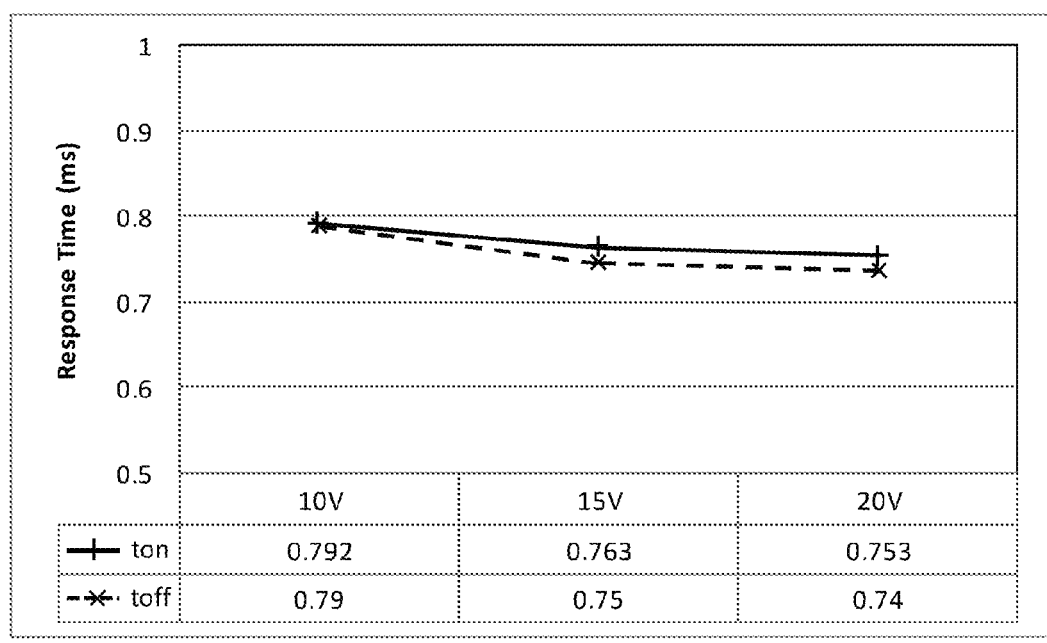

The ferroelectric liquid crystal cell and the anti-ferroelectric liquid crystal cell which are used in the present invention have a characteristic of a wide viewing angle, and thus the viewing angle of the 3D display apparatus of the present invention would not be affected. Besides, the response time of the ferroelectric liquid crystal cell and the anti-ferroelectric liquid crystal cell is less than the response time of the nematic liquid crystal (e.g. lower than 1 millisecond). Thus, the effect on the luminance of the 3D display apparatus is less than the display with active shutter 3D technology. Referring to FIGS. 4A and 4B, FIGS. 4A and 4B are graphs showing test results of the response time of the anti-ferroelectric liquid crystal cell used in the third embodiment of the present invention. FIG. 4A is a graph showing a response curve of the anti-ferroelectric liquid crystal cell used in the third embodiment of the present invention under an applied voltage of 10 volts. FIG. 4B is a graph showing the response time of the anti-ferroelectric liquid crystal cell used in the third embodiment of the present invention under applied voltages of 10 volts, 15 volts and 20 volts. Under the applied voltage of 10 volts, the turn-on response time (Ton) of the anti-ferroelectric liquid crystal cell used in the third embodiment is 0.792 milliseconds, and the turn-off response time (Toff) thereof is 0.79 milliseconds. When the applied voltage is raised to 20 volts, the turn-on response time (Ton) of the anti-ferroelectric liquid crystal cell used in the third embodiment is 0.753 milliseconds, and the turn-off response time (Toff) thereof is 0.74 milliseconds.

The present invention has been described with a preferred embodiment thereof and it is understood that many changes and modifications to the described embodiment can be carried out without departing from the scope and the spirit of the invention that is intended to be limited only by the appended claims.

The invention claimed is:

1. A three-dimensional (3D) display apparatus, characterized in that:
   the 3D display apparatus comprises a display and a liquid crystal cell module, and the display comprises a polarizer, and the liquid crystal cell module comprises a ferroelectric liquid crystal cell for retarding a phase of the light emitted from the display and corresponding to a display frame, as well as forming a left-handed circularly polarized light and a right-handed circularly polarized light of the display frame;
   wherein the liquid crystal cell module comprises the ferroelectric liquid crystal cell and a ¼ wave phase retarder, and the ferroelectric liquid crystal cell has a ½ wave phase retardation, and the ferroelectric liquid crystal cell and the ¼ wave phase retarder are bonded to a light-output surface of the display, and a 22.5 degree angle is therebetween an absorption axis of the polarizer of the display and the orientation of the ferroelectric liquid crystal cell, and the ¼ wave phase retarder is parallel to the absorption axis of the polarizer of the display, and an electric field is applied across the ferroelectric liquid crystal cell to alter a polarization direction thereof.

2. The 3D display apparatus according to claim 1, characterized in that: the display is a liquid crystal display.

3. A method for manufacturing a 3D display apparatus, characterized in that: the method comprises the following steps:
   providing a display, wherein the display comprises a polarizer;
   arranging a liquid crystal cell module at a light output side of the display for retarding a phase of the light which is emitted from the display and corresponds to a display frame for forming a left-handed circularly polarized light and a right-handed circularly polarized light corresponding to the display frame;
   wherein the liquid crystal cell module comprises a ferroelectric liquid crystal cell and a ¼ wave phase retarder, and the ferroelectric liquid crystal cell has a ½ wave phase retardation, and the ferroelectric liquid crystal cell and the ¼ wave phase retarder are bonded to a light-output surface of the display, and a 22.5 degree angle is therebetween an absorption axis of the polarizer of the display and the orientation of the ferroelectric liquid crystal cell, and the ¼ wave phase retarder is parallel to the absorption axis of the polarizer of the display, and an electric field is applied across the ferroelectric liquid crystal cell to alter a polarization direction thereof.

4. The method for manufacturing the 3D display apparatus according to claim 3, characterized in that: the display is a liquid crystal display.

* * * * *